UNITED STATES PATENT OFFICE.

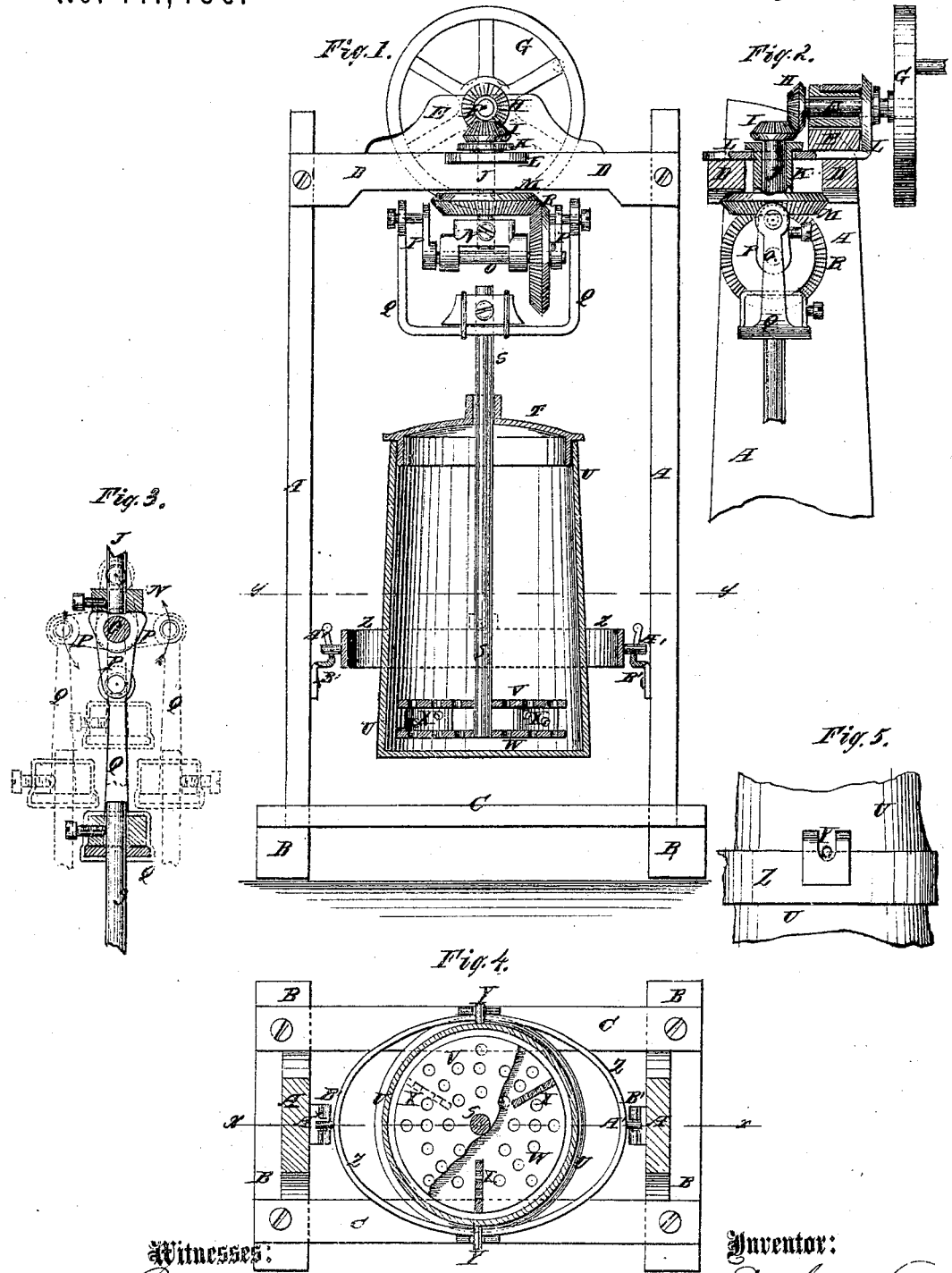

ESAU ARCHER, OF DAVISVILLE, WEST VIRGINIA.

IMPROVEMENT IN CHURNS.

Specification forming part of Letters Patent No. 141,480, dated August 5, 1873; application filed April 12, 1873.

*To all whom it may concern:*

Be it known that I, ESAU ARCHER, of Davisville, in the county of Wood and State of West Virginia, have invented a new and useful Improvement in Churning Apparatus, of which the following is a specification:

Figure 1 is a side view of my improved apparatus, partly in section, through the line $xx$, Fig. 4, to show the construction. Fig. 2 is a detail sectional view of the operating mechanism. Fig. 3 is a detail view, showing different positions taken by the upper end of the dasher-handle. Fig. 4 is a horizontal section of the same taken through the line $yy$, Fig. 1. Fig. 5 is a detail view, showing the manner in which the churn-body is hung.

Similar letters of reference indicate corresponding parts.

The invention consists in the improvement in churns, as hereinafter described and pointed out in the claim.

A are the uprights or standards, the lower ends of which are attached to the base bars B, which are connected and held in their proper relative position by the two cross-bars C. The upper ends of the standards A are connected and held in their proper relative positions by two cross-bars, D. To the middle part of one of the cross-bars D is attached a bracket or support, E, for the bearing of the short horizontal shaft F, to the outer end of which is attached a crank-wheel, G, which is made large and heavy, to serve also as a fly-wheel. To the inner end of the short shaft F is attached a bevel-gear wheel, H, the teeth of which mesh into the teeth of the bevel-gear wheel I, attached to the upper end of the short vertical shaft J, which works in a sleeve, K, attached to the plate L, which is attached to the cross-bars D. To the lower end of the sleeve K is attached a stationary bevel-gear wheel, M. To the lower end of the short vertical shaft J is attached a bar or plate, N, upon the lower side of which are formed lugs, in which revolves the short horizontal shaft O, to the ends of which are attached short cranks P, to the crank-pins of which are pivoted the upper ends of the bow or stirrup Q. To the shaft O, near one end, is attached a bevel-gear wheel, R, the teeth of which mesh into the teeth of the stationary gear-wheel M, to revolve the crank-shaft O upon its own axis while being swung around by the revolution of the vertical shaft J. To the center of the horizontal part of the stirrup Q is detachably secured, by a set-screw or other convenient device, the upper end of the dasher-handle S, which passes down through a hole in the cover T of the churn-body U, and to its lower end is attached at a little distance from each other two parallel horizontal plates, V W, which have a number of holes formed through them. Between the plates V W are secured three, more or less, vertical radial plates, X, which are also perforated, as shown in Figs. 1 and 4.

By this construction of the operating mechanism the dasher receives both a rotary and an up-and-down movement, which throws the milk into violent agitation, bringing the butter in a very short time.

The body U of the churn is made in the ordinary manner, and to its opposite sides are attached gudgeons Y, which rest in notches in the upper edges of the opposite sides of the ring Z. To the opposite sides of the ring Z, midway between the bearings for the gudgeons Y, are attached gudgeons A', which rest in open or half bearings B' attached to the inner sides of the uprights A. This arrangement allows the churn-body U to adjust itself to the various positions of the dasher-handle S, as it is operated by the operating mechanism, so as to diminish the friction and consequently the labor of churning.

Having thus described my invention, I claim as new and desire to secure by Letters Patent—

The combination of the crank fly-wheel G, short horizontal shaft F, bevel-gear wheels H I, short vertical shaft J, sleeve K, stationary bevel-gear wheel M, lug-plate N, shaft O, cranks P, bow or stirrup Q, and bevel-gear wheel R, with each other, to give a rotary movement and an up-and-down movement to the dasher-shaft, substantially as herein shown and described.

ESAU ARCHER.

Witnesses:
ISRAEL H. ARCHER,
JAMES A. DUST.